United States Patent [19]

D'Amico

[11] Patent Number: 4,573,270
[45] Date of Patent: Mar. 4, 1986

[54] MEASURING DEVICE FOR USE IN REMOTE LOCATIONS

[76] Inventor: Dennis D'Amico, 2073 - 64th Ave. S., St. Petersburg, Fla. 33712

[21] Appl. No.: 690,041

[22] Filed: Jan. 9, 1984

[51] Int. Cl.⁴ .............................................. G01B 5/02
[52] U.S. Cl. .................................. 33/143 K; 33/150; 33/192
[58] Field of Search ............ 33/143 M, 143 K, 143 L, 33/192, 150, 464

[56] References Cited

U.S. PATENT DOCUMENTS

| | | | |
|---|---|---|---|
| 1,262,678 | 4/1918 | Lapoint | 33/143 M |
| 1,703,736 | 2/1929 | Jacob | 33/192 X |
| 2,770,046 | 11/1956 | Wichmann | 33/192 X |

FOREIGN PATENT DOCUMENTS

| | | | |
|---|---|---|---|
| 1267789 | 6/1961 | France | 33/464 |
| 418655 | 2/1967 | Switzerland | 33/143 R |

*Primary Examiner*—Harry N. Haroian
*Attorney, Agent, or Firm*—Stanley M. Miller

[57] ABSTRACT

A measuring device that performs a measurement of the amount of distance between a preselected reference point and a remote object. The device is made so that the measurement made is stored therein until the device can be retrieved from the remote location and brought to a location where it can be conveniently read. A first rotatably mounted, fixed position gear member is engaged by a first rack gear member which rack gear member is reciprocated by manipulation of a handle member. The first rotatably mounted gear member is fixedly secured to and disposed concentric with a second fixed position rotatably mounted gear member, and the second gear member engages a second rack gear member that is fixedly secured to a ruler member that is slideably mounted within a housing. Thus, manipulation of the handle member effects extension of the ruler from the housing or retraction thereinto. A ledge-detecting member is provided at the forward end of the housing so that the distance from a ledge to a remote object is measured when the ruler extends from the housing and abuts the remote object.

6 Claims, 6 Drawing Figures

MEASURING DEVICE FOR USE IN REMOTE LOCATIONS

BACKGROUND OF THE INVENTION

1. Field of the Invention

This invention relates, generally, to ruler-type measuring devices. More specifically, the inventive device has specific utility in measuring the distance between a ceiling and the uppermost edge of a tile (or between a wall and the nearest edge of a tile) so that the tile installer can determine the size of tile needed to fill a space too small to receive a full-size tile.

2. Description of the Prior Art

A search of United States patents that was conducted prior to the filing of this disclosure located the following patents in the field of this invention:

| Patentee | U.S. Pat. No. | Date of Issue |
| --- | --- | --- |
| Darling | 477,105 | 06/14/1892 |
| Fessler | 794,170 | 07/11/1905 |
| Riesler | 1,619,091 | 03/01/1927 |
| Zangrando | 2,144,697 | 01/24/1939 |
| Campbell | 2,828,546 | 04/01/1958 |
| Parr | 3,183,598 | 05/18/1965 |
| Keszler | 3,200,501 | 08/17/1965 |
| Poulos | 3,718,980 | 03/06/1973 |
| Gartner | 3,808,692 | 05/07/1974 |

Tiles are vitreous, brittle articles often used as wall or floor coverings due to their low porosity and attractive appearance. Unlike floors and walls, however, tiles are manufactured in standard sizes. Thus, when a floor or wall is being covered by tiles, an uncovered space of irregular size is usually left when the tile setting has been substantially completed. The irregular-size area to be covered by tiles smaller than full-size tiles is usually the area where a wall meets a ceiling or a floor. The individual setting the tiles must then measure the space remaining to be covered, and cut the remaining tiles to be installed down to size. Where a plurality of tiles need to be reduced in size, as is usually the case, the job of making a plurality of measurements (one for each space to be covered), can be very time-consuming.

Since ceilings are not at eye level, the tile setter often employs a ladder so that the correct measurement can be read from his ruler. Moving a ladder many times consumes considerable amounts of time, thus driving up the costs of tile setting. Of course, the tile setter must climb up and down the ladder between measurements as well.

There is a need for a device that would enable a tile setter to remain on the floor when measuring the distance between the last full tile covering a wall and a ceiling, or that would at least enable the tile setter to avoid climbing very high on a ladder to make the needed measurements. A device that could be held in a hand extended over one's head, which device would include a means for detecting the upper ledge formed by the last full tile before the ceiling and which would further include a means for extending the ruler portion of the device which could be operated by such extended hand would be a device having great utility in the art of tile setting, but such a device was unknown prior to the filing of this disclosure.

Darling, for example, shows a caliper rule with a free-sliding gib. A wedge means tightens the gib when it is in its desired position. The drawback of the Darling device is that its user must pull upon the gib to effect its extension, which requirement renders it substantially unusable in remote locations.

Fessler's device is a gage for finding the center point between two (2) spaced objects. It employs a pair of rack gear members and a pinion gear.

The Rieser device enables a tile setter to score a tile that needs to be reduced in size. However, the Rieser device requires the use of both hands and does not eliminate the need for a ladder since the tile setter must manipulate a scoring means at the remote (overhead) location.

Zangrando's device is useful for marking a tile where it is to be cut, but the initial measurement of the space between the last full tile and the ceiling must still be made with a ruler when such device is used.

The Parr device requires the tile setter, as in the other devices, to position himself at the remote location. He must place a full, unattached tile in overlying relation to the last full tile that has been attached to the wall being covered, and mark the unattached tile after having previously adjusted the telescoping device so that it defines the width of the specific tiles being used.

Similarly, Poulos' construction employs a free-sliding guide member which must be tightened and loosened between measurements by a nut and bolt mechanism.

A need exists for a device that can be operated by one (1) hand while such hand is extended to a remote, relatively high location and that has a measuring means that can be held in position in the absence of nuts and bolts so that a plurality of measurements can be taken in a short time. The devices of the prior art do not fulfill the need.

SUMMARY OF THE INVENTION

The longstanding but heretofore unfulfilled need for a device that overcomes the limitations that restrict the utility of earlier devices in the field of this invention is now fulfilled in the form of a lightweight, hand-held, longitudinally extending measuring device that incorporates the use of rack and pinion gears.

The device consists of a hollow housing that slideably contains a ruler member, and a unique arrangement of gears that allows the user of the device to extend and retract the ruler out of and into the housing by slideably displacing a knob member with a thumb or finger of the hand holding the device while the same is extended over the head of such user. Thus, the user need not position himself any nearer to the remote location where the measurement is being taken than the position where such location can be reached with an upwardly extended arm. Since the novel gear arrangement maintains the position of the ruler after the measurement has been taken, the user of the invention need not read the measurement at the time it is taken but may simply lower his arm in order to read it.

The novel gear arrangement includes two (2) rack gears and two (2) spur gears. The first rack gear is formed in an edge of a slot that is formed in a flat plate. The flat plate is disposed interiorly of the housing and is free to slide therein with respect thereto, but a second slot which is formed in the top wall of the housing allows a knob member fixedly secured to the plate to extend outwardly of the housing where it can be manipulated by the thumb (or any finger) of the user of the invention. Thus, user-activated travel of the knob within its slot effects a simultaneous and corresponding travel of the flat plate and hence of the rack and gear member formed in such plate.

A fixed position but rotatably mounted pinion gear is meshingly engaged with the plate's rack gear. The pinion gear is disposed concentric with a larger gear that is also fixed position but which is mounted for conjoint rotation with the pinion gear. The larger gear is meshingly engaged with a second rack gear which is an elongate member fixedly secured along its length to the ruler member that accomplishes the actual measurement. Thus, rotation of the larger gear effects extension and retraction of the ruler member.

A flange that extends perpendicularly away from the ruler is secured to the leading edge of the housing of the device so that such leading edge can be conveniently brought into registration with a ledge formed by a last full tile. Once the flange has engaged the ledge, thereby aligning the leading edge of the housing with the ledge, the tile setter may use his thumb or any finger to pull the knob downwardly to effect longitudinal extension of the ruler out of the housing. When the leading edge of the ruler contacts the ceiling, the digit is removed from the knob. Due to the gear arrangement, the removal of the digit from the knob does not allow the ruler to move. Thus, the device can then be returned to eye level so that the measurement taken can be read. The reading is accomplished visually by noting the graduation on the ruler which is traversed by the leading edge of the housing of the device.

An important object of this invention is to provide a measuring device having utility in hard to reach locations.

More specifically, an important object of this invention is to provide a measuring device that can measure the distance between an overhead tile and a ceiling without there being a need for the user of the device to align his or her eyes at the level where the measurement is being taken.

The invention accordingly comprises the features of construction, combination of elements and arrangement of parts that will be exemplified in the construction hereinafter set forth, and the scope of the ivention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
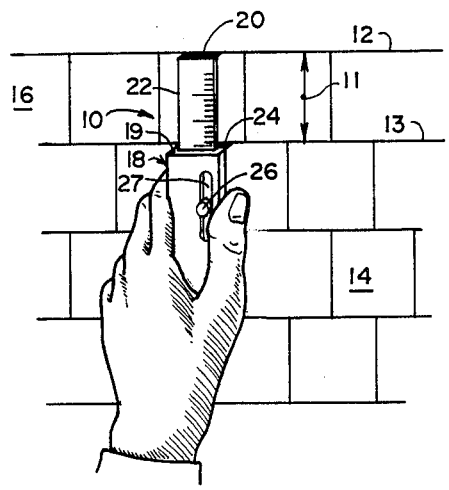
FIG. 1 is a perspective view showing a first embodiment of the invention in use.

FIG. 1 shows the device 10 which is the subject of this invention being used to measure the distance, indicated by the double headed arrow 11, between a ceiling 12 and a ledge 13, which ledge 13 is formed by the upper edge of a last or uppermost full tile 14 and wall 16. Distance 11 determines the size of the tiles (not shown) that will be needed to fill space 16. The device 10, which includes longitudinally extending housing 18, is shown being held with the free end 20 of ruler 22 abutting ceiling 12, and with a flange 24 engaging ledge 13. The ruler 22 is fully retractable within the housing 18 or fully extensible therefrom, responsive to manipulation of handle means or knob 26 (moveable within slot 27) which is also shown in FIG. 1. Thus, to use the device, all that the tile setter needs to do is (1) position the device 10 so that flange 24 engages ledge 13, and (2) manipulate knob 26 in the manner to be hereinafter described to effect extension of the ruler 22 out of housing 18 until its leading edge 20 abuts the ceiling 12. The device 10 is then brought down to the eye level of the tile setter and the measurement so taken can be read by noting where the graduated ruler 22 is in registration with the leading edge 19 of the housing 18.

Figure 2:
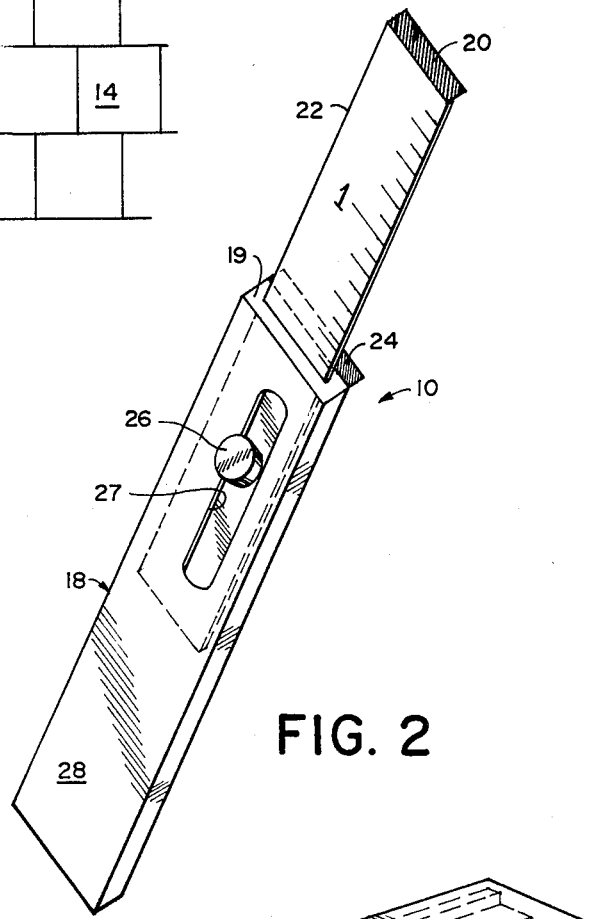
FIG. 2 is an isometric view of an embodiment of the invention, with the internal parts of the invention not being shown.

The device 10 is shown in slightly greater detail in FIG. 2. It will there be seen that slot 27 is formed in housing wall 28. As shown in the drawings to be described hereinafter, knob 26 is fixedly secured to a flat plate member, not shown in FIG. 2, that is disposed just below housing top wall 28, in sliding engagement therewith.

Figure 3:
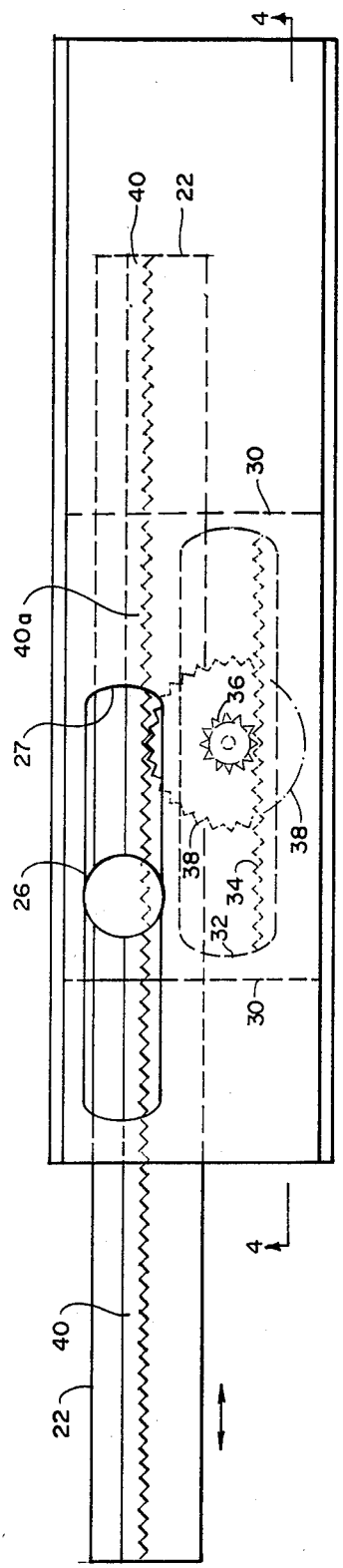
FIG. 3 is a plan view of the embodiment of FIGS. 1 and 2, with the top wall thereof being removed.

The flat plate member just referred to is indicated in FIG. 3 by the reference numeral 30. Top wall 28 has been removed from the device to simplify FIG. 3, so plate 30 is shown in solid lines. However, slot 27 which is formed in wall 28 is shown to indicate the preferred orientation of the inventive parts.

A different slot 32 is formed in sliding plate 30. A rack gear means 34 defines the lower edge of slot 32, the teeth of which engage rotatably mounted, but fixed position, pinion gear 36. Gear 36 is secured to larger gear 38, which gear 38 is also rotatably mounted and fixedly positioned. Thus, rotation of pinion gear 36 effects a simultaneous and corresponding rotation of gear 38. In the preferred embodiment, one (1) rotation of the larger gear 38 will require three (3) rotations of pinion gear 36. Other gear ratios and the use of idler gears and the like are within the scope of this invention, however, as those skilled in the art of gear trains will recognize.

The just-mentioned rotation of pinion gear 36 is achieved by reciprocation of rack gear 34. Knob 26 is fixedly secured to sliding plate 30, as aforesaid, so displacement of knob 26 within its slot 27 will effect simultaneous and corresponding displacement of plate 30 and hence of rack gear 34, pinion gear 36, and larger gear 38.

The teeth of the larger gear 38 engage the teeth of a second rack gear means 40, which rack gear 40 is fixedly secured to ruler 22 as shown. Accordingly, displacement of knob 26 (by the tile setter's thumb or finger) so that it travels to the right in FIG. 3 will effect leftward travel of ruler 22. Due to the aforementioned gear ratio, a one inch (1") displacement of knob 26 will effect a three inch (3") displacement of ruler 22.

Figure 4:
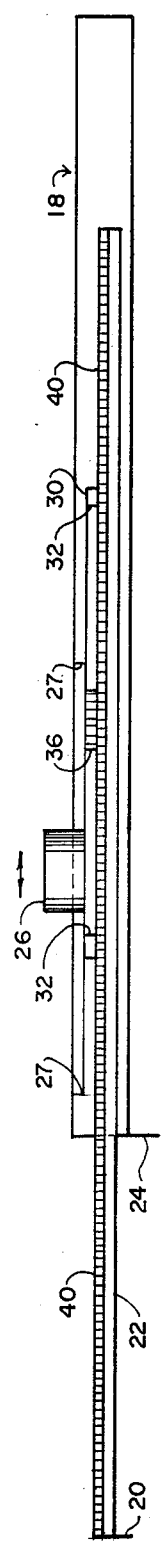
FIG. 4 is a side elevational view of said embodiment.
Figure 5:
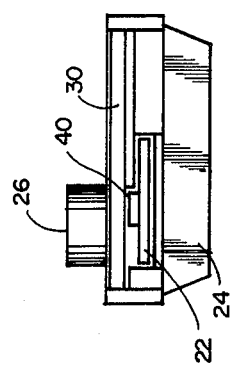
FIG. 5 is an end view of said embodiment.

FIGS. 4 and 5 show additional views of the embodiment shown in FIGS. 1-3.

Figure 6:
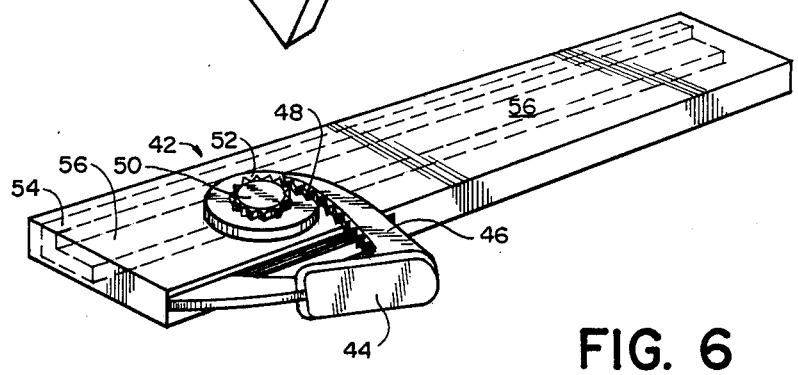
FIG. 6 is a perspective view of an alternative embodiment of the invention.

An alternative embodiment of the invention is shown in FIG. 6 and is designated by the reference numeral 42 as a whole. In this embodiment, a spring-loaded, pivotally mounted handle member 44 terminates in a laterally disposed arm 46 having teeth 48 formed therein as shown. The teeth 48 meshingly engage a rotatably mounted pinion gear 50 which in turn is mounted for conjoint rotation with a larger gear 52 as in the first-described embodiment. Thus, displacement of handle 46 effects rotation of pinion gear 50 which in turn effects rotation of larger gear 52. The teeth of gear 52 engage the teeth of a rack gear 54 fixedly secured to ruler 56. Thus, the operation of this embodiment is quite similar to the operation of the first-described embodiment.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device that measures distances while the device is being held in a remote location where the measurement cannot be accurately read in a convenient manner, and which stores the measurement until the device can be moved to a location more suitable for accurate reading of the measurement taken, comprising, an elongate, substantially hollow housing configured and dimensioned to be easily grasped by a human hand, said housing having a leading edge and a trailing edge longitudinally spaced therefrom, an elongate ruler member slideably received within said housing, said ruler member having a leading edge, a flat plate member slideably disposed interiorly of said housing, means for enabling linear reciprocation of said flat plate within said housing including a slot means formed in a wall of said housing through which slot means extends a knob member that is fixedly secured to said plate and which knob member is configured and dimensioned to be manipulated by a human digit to effect its travel within said slot means and hence to effect simultaneous and corresponding travel of said flat plate, means for transmitting the reciprocation of said flat plate to said ruler member so that said ruler member is extended from and retracted into said housing attendant such plate reciprocation, a ledge-detecting means useful for aligning the leading edge of said housing with a ledge that is spaced from an object by a distance to be measured by said device, whereby displacement of said ruler member so that it extends longitudinally outward of said housing until its leading edge abuts said object produces an alignment of the leading edge of said housing and said ruler member which alignment provides a reading of the distance between said leading edge and said object, which reading can be made when said device is removed from said remote location.

2. The device of claim 1, wherein the means for transmitting the reciprocation of said flat plate to the ruler member includes, at least in part, a longitudinally extending slot formed in said flat plate, a rack gear means formed along a longitudinally extending edge of said slot, and a fixed position, rotatably mounted pinion gear means meshingly engaged with said rack gear means.

3. The device of claim 1, wherein said means for transmitting the reciprocation of said flat plate to said ruler member futher includes a fixed position gear means mounted concentric to said pinion gear means and fixedly secured thereto for conjoint rotation therewith, and a rack gear means fixedly secured to said ruler member along its extent with which ruler rack gear means said gear means is meshingly engaged so that rotation of said gear means which is effected by rotation of said pinion gear means which in turn is effected by reciprocation of said flat plate rack gear means acts to cause longitudinally directed reciprocation of said ruler member.

4. The device of claim 3, wherein the respective diameters of the pinion gear means and the gear means are selected so that the gear ratio thereby determined causes the amount of longitudinal displacement of said ruler member responsive to manipulation of said knob member to be greater than the amount of longitudinal displacement of said knob member.

5. The device of claim 4, wherein the gear ratio selected is 3:1 so that a one inch displacement of said knob member effects a three inch displacement of said ruler member.

6. The device of claim 5, wherein said ledge-detecting means is a flange member fixedly secured to the leading edge of the housing of said device and which flange member is disposed orthogonally to the plane of the ruler member and which flange member extends away therefrom so that when it engages the uppermost edge of a tile, the leading edge of the housing is precisely aligned with the uppermost edge of said tile.

* * * * *